United States Patent
Motoki et al.

(10) Patent No.: US 10,065,600 B2
(45) Date of Patent: Sep. 4, 2018

(54) VEHICLE DOOR OPENING AND CLOSING CONTROL DEVICE

(71) Applicants: Masayuki Motoki, Aichi (JP); Hirohito Miyazaki, Gifu (JP); Kenshin Oh, Aichi (JP)

(72) Inventors: Masayuki Motoki, Aichi (JP); Hirohito Miyazaki, Gifu (JP); Kenshin Oh, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/842,549

(22) Filed: Dec. 14, 2017

(65) Prior Publication Data

US 2018/0163454 A1 Jun. 14, 2018

(30) Foreign Application Priority Data

Dec. 14, 2016 (JP) .................................. 2016-242042

(51) Int. Cl.
| | |
|---|---|
| *B60R 25/00* | (2013.01) |
| *B60R 25/01* | (2013.01) |
| *E05F 15/655* | (2015.01) |
| *E05F 15/73* | (2015.01) |
| *E05B 83/36* | (2014.01) |
| *B60R 25/20* | (2013.01) |

(52) U.S. Cl.
CPC .......... *B60R 25/01* (2013.01); *B60R 25/2054* (2013.01); *E05B 83/36* (2013.01); *E05F 15/655* (2015.01); *E05F 15/73* (2015.01); *E05F 2015/765* (2015.01); *E05Y 2400/858* (2013.01)

(58) Field of Classification Search
CPC .... B60R 25/2054; B60R 25/01; E05F 15/655; E05F 15/73; E05F 2015/765; E05B 83/36; E05Y 2400/858
See application file for complete search history.

(56) References Cited

U.S. PATENT DOCUMENTS

| | | | |
|---|---|---|---|
| 9,707,929 B2 | 7/2017 | Holzberg et al. | |
| 2013/0234828 A1* | 9/2013 | Holzberg | ............ B60R 25/2054 340/5.72 |

(Continued)

FOREIGN PATENT DOCUMENTS

| | | |
|---|---|---|
| JP | 2009-127336 A | 6/2009 |
| JP | 2014-500414 A | 1/2014 |
| JP | 2014/227717 A | 12/2014 |

*Primary Examiner* — Thomas Alunkal
(74) *Attorney, Agent, or Firm* — Osha Liang LLP (57) ABSTRACT

A vehicle door opening and closing control device opens or closes a door of a vehicle according to a kicking motion of a leg detected by a kick sensor. A threshold is set for output from the kick sensor. Motion duration time until the output from the sensor falls below the threshold after the output from the sensor exceeds the threshold in a kicking motion is measured. Motion completion estimated time until the kicking motion is completed is calculated according to the motion duration time, for example, by assuming that motion completion estimated time=motion duration time/2. When the elapsed time after the output from the sensor falls below the threshold reaches the motion completion estimated time, opening operation or closing operation of the door starts.

7 Claims, 8 Drawing Sheets

(56) References Cited

U.S. PATENT DOCUMENTS

| | | | |
|---|---|---|---|
| 2014/0070920 A1* | 3/2014 | Elie | H03K 17/945 340/5.72 |
| 2016/0039365 A1* | 2/2016 | Vanderwall | B60R 25/24 701/36 |
| 2016/0265263 A1* | 9/2016 | Motoki | E05F 15/73 |
| 2017/0009509 A1* | 1/2017 | Ryu | B60W 50/08 |
| 2017/0106836 A1* | 4/2017 | Sobecki | G06F 3/0425 |
| 2017/0152697 A1* | 6/2017 | Dehelean | E05F 15/73 |
| 2017/0241186 A1* | 8/2017 | Koda | E05F 15/75 |
| 2017/0241187 A1* | 8/2017 | Takayanagi | E05F 15/75 |

\* cited by examiner

Ton: Motion duration time
Toff: Motion completion estimated time

⇒ Start of back door opening or closing operation

FIG. 5C

Ton: Motion duration time
Toff: Motion completion estimated time

⇒ Start of back door opening or closing operation

VEHICLE DOOR OPENING AND CLOSING CONTROL DEVICE

CROSS-REFERENCE TO RELATED APPLICATION

This application is based on Japanese Patent Application No. 2016-242042 filed with the Japan Patent Office on Dec. 14, 2016, the entire contents of which are incorporated herein by reference.

FIELD

The disclosure relates to a vehicle door opening and closing control device that detects a predetermined motion of a body part such as a leg and opens and closes a door of a vehicle.

BACKGROUND

The following systems are conventionally known as examples of a system for opening and closing a sliding door or a back door of a vehicle: a system in which a portable device transmits a control signal to a vehicle when a user operates the portable device, and the door opens or closes according to the control signal; and a system in which the door opens or closes according to communication between a portable device and a vehicle when a user carrying the portable device approaches the vehicle (for example, see JP 2009-127336 A, JP 2014-227717 A).

JP 2009-127336 A discloses that, in a case where a user carrying the portable device approaches the vehicle, the timing of opening the door is made earlier when approaching speed is faster, and the timing of opening the door is delayed when the approaching speed is slower. Thus, the door is opened at a timing according to the approaching speed of the user to the vehicle. In addition, JP 2014-227717 A discloses that, time taken for the user to arrive at the vehicle is periodically calculated based on the distance from the portable device carried by the user to the vehicle and a temporal change in the position of the portable device, and opening speed of the door is controlled according to the time taken for the user to arrive at the vehicle.

In addition, a door opening and closing system is known which is capable of opening a door of a vehicle by a leg motion (for example, a kicking motion) even in a case where a user holds baggage with both hands (for example, see JP 2014-500414 W).

JP 2014-500414 W discloses that two sensors for detecting a kicking motion of a leg are disposed at different places at a rear of the vehicle. A time difference between a signal output from one sensor and a signal output from the other sensor is detected. In a case where the time difference satisfies a predetermined criterion, it is determined that a kicking motion of a leg is performed and the door is opened.

In a case of detecting a kicking motion of a leg and opening or closing the door of the vehicle, kicking speed varies from individual to individual. In the case of a user with faster kicking speed, the time from swinging forward of the leg to landing is shorter. In the case of a user with slower kicking speed, the time from swinging forward of the leg to landing is longer. In contrast, a door opening or closing operation is started after a fixed time has elapsed from a time point when sensor output is lowered to a predetermined level, in a process until the leg has landed (to be described later).

Therefore, if the kicking speed is faster, opening or closing of the door does not start at the time point when the leg has landed, and opening or closing of the door starts after a while. Therefore, the user feels that the time until the door has opened or closed is long. In contrast, if the kicking speed is slower, opening or closing of the door starts before the leg has landed. Therefore, the user feels that the time until the door has opened or closed is long.

SUMMARY

An object of the disclosure is to provide a vehicle door opening and closing control device capable of opening and closing a door at an optimal timing according to motion speed of a body part.

A vehicle door opening and closing control device according to one or more embodiments of the disclosure includes: a sensor provided near a door of a vehicle and configured to detect a predetermined motion of a body part of a user according to approach and separation of the body part; and a controller configured to perform opening operation or closing operation of the door of the vehicle, according to the predetermined motion of the body part detected by the sensor. A threshold is set for output from the sensor. The vehicle door opening and closing control device further includes: a first time measuring unit configured to measure motion duration time until the output from the sensor falls below the threshold after the output from the sensor exceeds the threshold in the predetermined motion of the body part; a second time measuring unit configured to measure elapsed time after output from the sensor falls below the threshold; and a calculator configured to calculate motion completion estimated time until the predetermined motion is completed after motion duration time measured by the first time measuring unit elapses, the motion completion estimated time calculated according to the motion duration time. When the elapsed time measured by the second time measuring unit reaches the motion completion estimated time calculated by the calculator, the controller starts opening operation or closing operation of the door of the vehicle.

According to the vehicle door opening and closing control device described above, in a case where a motion of the body part is faster, the motion duration time is shorter. Therefore, the motion completion estimated time becomes shorter. In addition, in a case where a motion of the body part is slower, the motion duration time is longer. Therefore, the motion completion estimated time becomes longer. In both the cases, the opening operation or the closing operation of the door starts at a time point when the motion completion estimated time has elapsed, that is, at a time point when the predetermined motion of the body part is completed. Therefore, the problem that the user feels that the time taken for the door to open or close is long or short can be solved.

In one or more embodiments of the disclosure, for example, the calculator may calculate time of ½ of the motion duration time measured by the first time measuring unit as the motion completion estimated time.

In one or more embodiments of the disclosure, the sensor may detect a predetermined motion of a leg of a user according to approach and separation of the leg. The predetermined motion in this case is, for example, a kicking motion of the leg.

In one or more embodiments of the disclosure, the vehicle door opening and closing control device may further include an authentication unit configured to authenticate whether or not a portable device carried by a user is an authorized portable device according to identification information transmitted from the portable device carried by the user. In this case, when the authentication unit authenticates the portable device as an authorized portable device, and the above-described elapsed time has reached the motion completion estimated time, the controller starts the opening operation or the closing operation of the door of the vehicle. The authentication unit may perform authentication after the predetermined motion is detected by the sensor or may perform authentication before the predetermined motion is detected by the sensor.

According to one or more embodiments of the disclosure, it is possible to open and close the door of the vehicle at an optimal timing according to the motion speed of the body part such as a leg.

DETAILED DESCRIPTION

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 1:
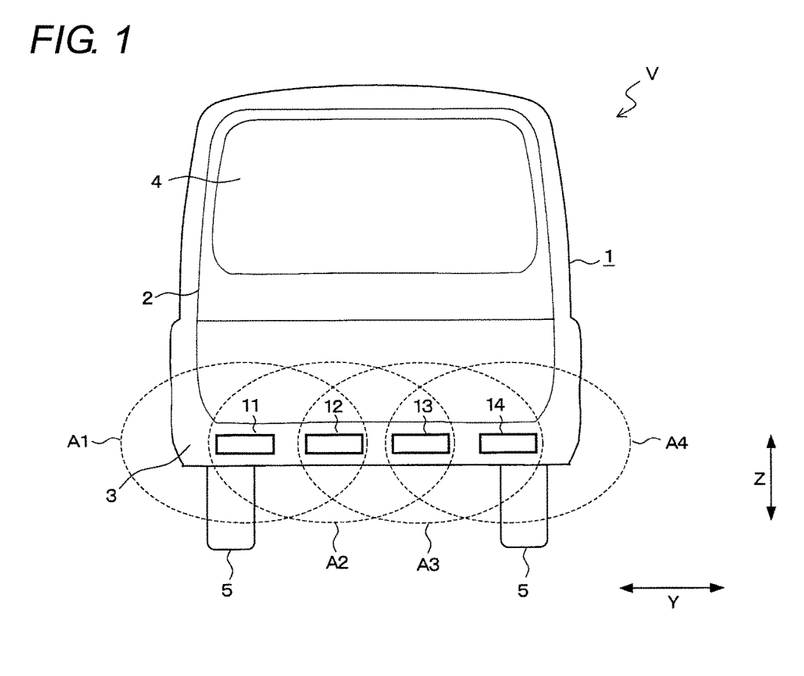
FIG. 1 is a rear view of a vehicle on which a vehicle door opening and closing control device is mounted.
Figure 2:
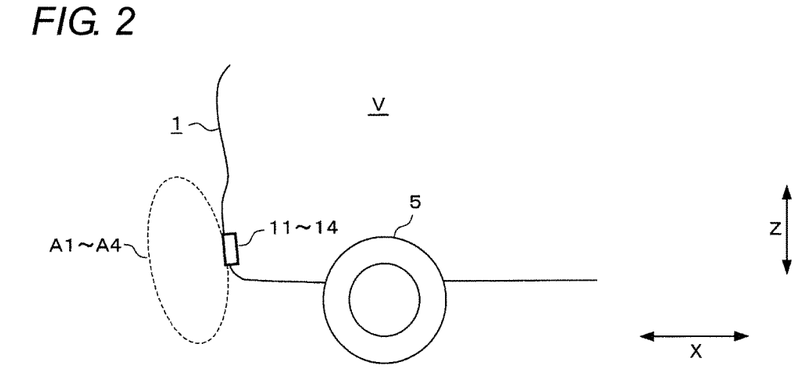
FIG. 2 is a partial side view of the vehicle in FIG. 1.

First, a configuration of a vehicle door opening and closing control device will be described with reference to FIGS. 1 to 3. FIG. 1 is a view of a vehicle V as viewed from the rear, and FIG. 2 is a view of the vehicle V as viewed from a side. In the drawings, arrow X represents the front-rear direction, arrow Y represents the right-left direction, and arrow Z represents the up-down direction.

In FIGS. 1 and 2, the vehicle V is a passenger car and includes a vehicle body 1, a back door 2, a rear bumper 3, a rear window 4, tires 5, and a plurality (four in this case) of kick sensors 11 to 14, and the like.

The kick sensors 11 to 14 are sensors for detecting a kicking motion of a leg of a user according to approach and separation of the leg of the user. Each of the kick sensors 11 to 14 is configured of, for example, a capacitive proximity sensor. The kick sensors 11 to 14 are arranged on the rear bumper 3 near the back door 2, at predetermined intervals in the horizontal direction (Y direction). The kick sensors 11 to 14 have detection areas A1 to A4 indicated by broken lines, respectively.

As illustrated in FIG. 1, each of the detection areas A1 to A4 extends in the right-left direction Y and the up-down direction Z, and also extends in the front-rear direction X as illustrated in FIG. 2. As can be seen from FIG. 1, the detection areas of the adjacent kick sensors partially overlap each other in the arrangement direction of the kick sensors (Y direction).

Figure 3:
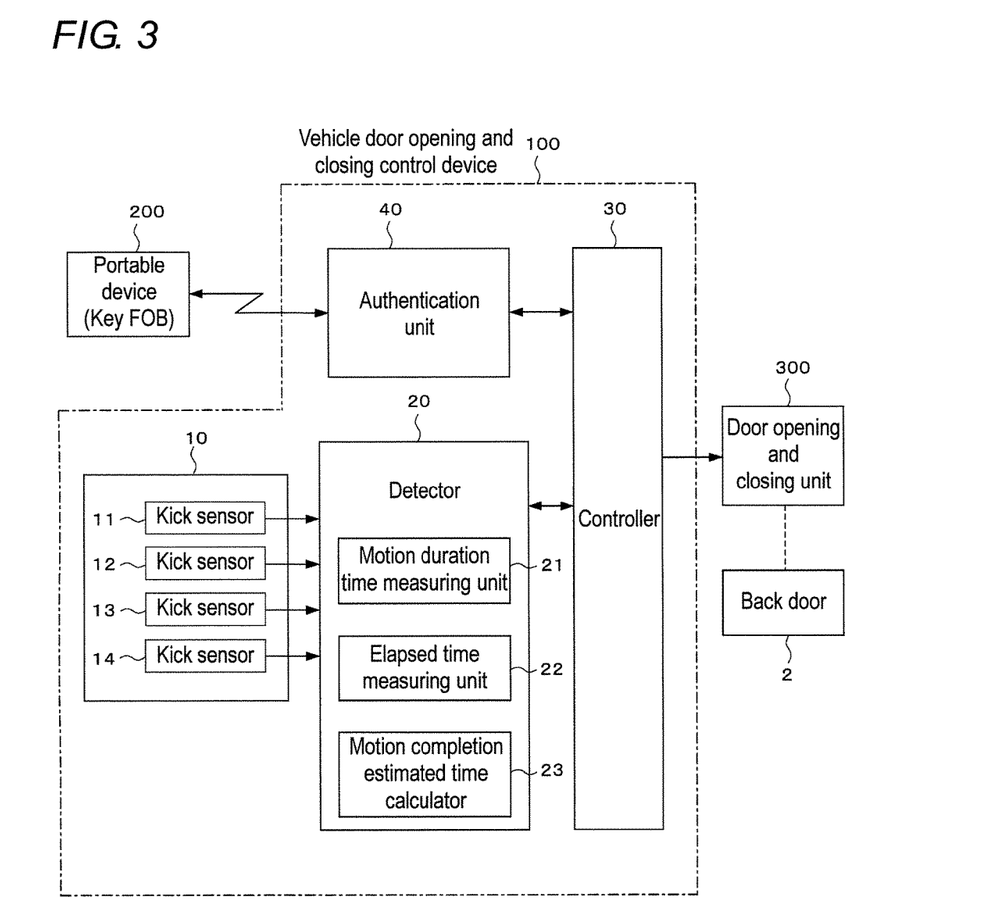
FIG. 3 is a block diagram of the vehicle door opening and closing control device.

FIG. 3 is a block diagram illustrating an example of the electrical configuration of the vehicle door opening and closing control device. The vehicle door opening and closing control device 100 is mounted on the vehicle V in FIG. 1, and includes a sensor 10, a detector 20, a controller 30, and an authentication unit 40. Note that FIG. 3 illustrates only blocks related to the disclosure.

The sensor 10 is configured of the above-described kick sensors 11 to 14. The detector 20 detects the state of a kicking motion according to output from the sensor 10. The detector 20 includes a motion duration time measuring unit 21, an elapsed time measuring unit 22, and a motion completion estimated time calculator 23. Details of the motion duration time measuring unit 21, the elapsed time measuring unit 22, and the motion completion estimated time calculator 23 will be described later. The motion duration time measuring unit 21 corresponds to a "first time measuring unit" in the disclosure. The elapsed time measuring unit 22 corresponds to a "second time measuring unit" in the disclosure. The motion completion estimated time calculator 23 corresponds to a "calculator" in the disclosure. The functions of the motion duration time measuring unit 21, the elapsed time measuring unit 22, and the motion completion estimated time calculator 23 are actually realized by software.

The controller 30 is configured of a CPU, a memory and the like. In a case where the sensor 10 detects a kicking motion, the controller 30 controls a door opening and closing unit 300 according to a signal output from the detector 20, and opens or closes the back door 2 of the vehicle V.

The door opening and closing unit 300 is configured of a motor for opening and closing the back door 2, an actuator for locking and unlocking the back door 2, a drive circuit for driving the motor and the actuator, and the like (not illustrated).

A portable device 200 carried by a user includes an operation unit configured of a key FOB and operated by the user, a communicator which communicates with the authentication unit 40, and the like (not illustrated).

The authentication unit 40 communicates with the portable device 200 and authenticates the portable device 200. Specifically, when the user approaches the vehicle, the authentication unit 40 requests the portable device 200 to transmit identification information. The identification information is, for example, a key ID assigned to the portable device 200. Then, the authentication unit 40 collates the identification information received from the portable device 200 with identification information stored in advance, and authenticates whether or not the portable device 200 is an authorized portable device according to the collation result. The authentication unit 40 also includes a communicator that communicates with the portable device 200, a storage that stores identification information of the portable device 200, and the like (not illustrated).

Figure 4A:
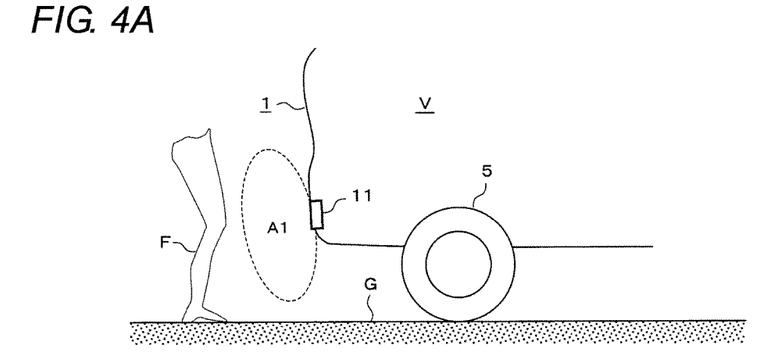
FIGS. 4A to 4C are views for explaining detection of a kicking motion by a kick sensor.
Figure 4B:
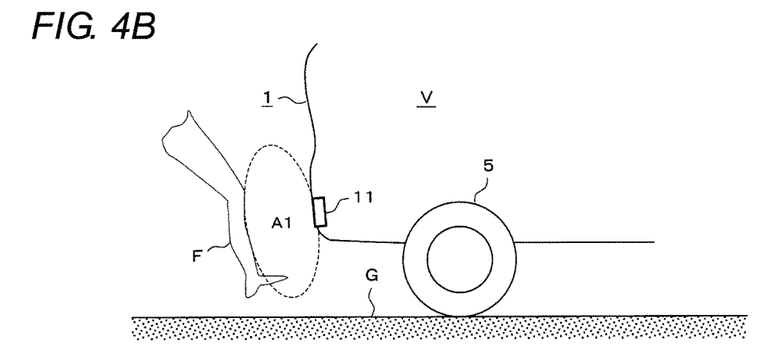
Figure 4C:
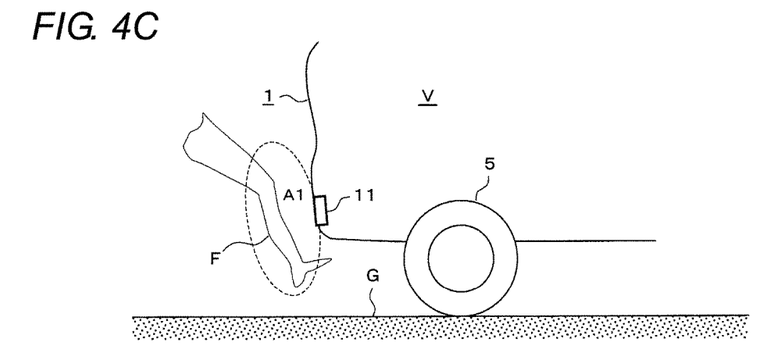

Next, details of the kicking motion will be described with reference to FIGS. 4A to 4C. In FIGS. 4A to 4C, for the sake of convenience, only the kick sensor 11 and the detection area A1 of the kick sensor 11 are illustrated. When the user opens or closes the back door 2 (FIG. 1), the user stands behind the vehicle V and performs a kicking motion at the position of the kick sensor 11. FIG. 4A illustrates a state immediately before the user swings a leg F forward. In this state, since the leg F does not enter the detection area A1, the kick sensor 11 does not detect the leg F. FIG. 4B illustrates a state immediately after the user swings the leg F forward and the leg F has entered the detection area A1. In this state, the kick sensor 11 detects the leg F. However, at this time point, since only part of the leg F is detected, the sensor output level is low. FIG. 4C illustrates a state where the user further swings the leg F forward and the toe has entered between the vehicle body 1 and the ground G. In this state, the leg F remains to be in the detection area A1, and the kick sensor 11 continuously detects the leg F. Since a large part of the leg F is detected, the sensor output level increases. Then, the user pulls the leg F backward, and the leg F returns to the state in FIG. 4A via the state in FIG. 4B. The series of motions described above is the kicking motion of the leg F.

In such a kicking motion, kicking speed varies from individual to individual as described in the beginning. Therefore, a user with faster kicking speed feels that time until the back door 2 starts to open or close is long, and a user with slower kicking speed feels that time until the back door 2 starts to open or close is short. Therefore, in the disclosure, the above-described problem is solved by making the time until the back door 2 starts to open or close variable according to kicking speed of the user.

Figure 5A:
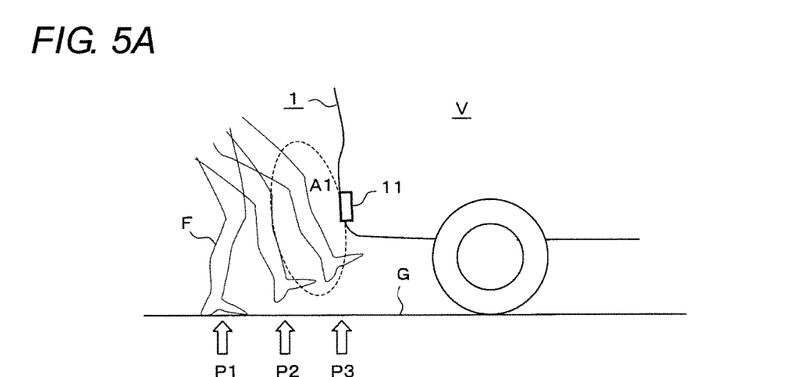
FIGS. 5A to 5C are a view and diagrams for explaining a principle of one or more embodiments of the disclosure.
Figure 5B:
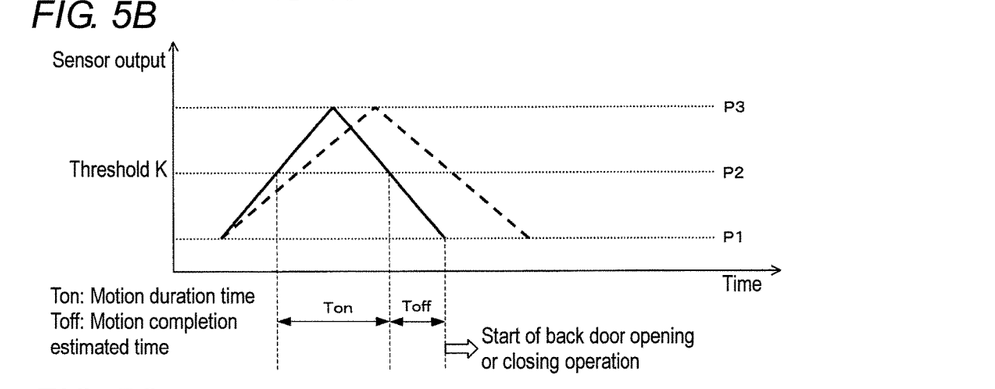
Figure 5C:
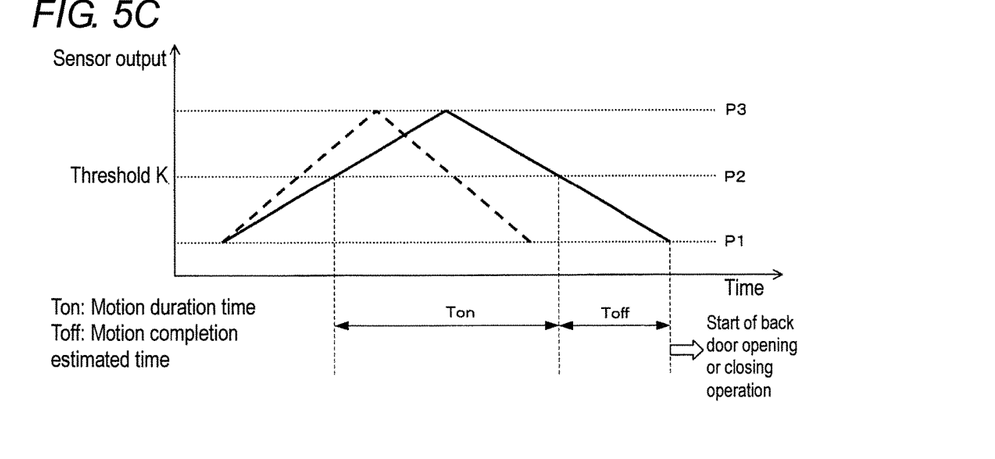

FIGS. 5A to 5C are a view and diagrams for explaining a principle of one or more embodiments of the disclosure. FIG. 5A illustrates positions P1, P2, P3 of the leg F in the kicking motion. FIGS. 5B and 5C illustrate relationships between the positions P1, P2 and P3 of the leg F and output from the sensor (here, the kick sensor 11). FIG. 5B illustrates a case where kicking speed is faster. FIG. 5C illustrates a case where kicking speed is slower.

In a case where the kicking motion is performed as illustrated in FIG. 5A, if the kicking speed is faster than a standard speed, the sensor output changes as indicated by the solid line in FIG. 5B depending on the positions P1, P2, P3 of the leg F. In addition, if the kicking speed is slower than the standard speed, the sensor output changes as indicated by the solid line in FIG. 5C depending on the positions P1, P2, P3 of the leg F. The broken line indicates sensor output in a case where the kicking speed is the standard speed. Note that even though actual sensor output is not a straight line as illustrated in the FIGS. 5B and 5C, the sensor output is schematically illustrated as a straight line for the sake of convenience.

As illustrated in FIGS. 5B and 5C, a threshold K is set for the sensor output. This threshold K is stored in the detector 20 illustrated in FIG. 3. In this example, the threshold K is set to the value of the sensor output when the leg F is at the position of P2, that is, immediately after the leg F has entered the detection area A1. Here, it is assumed that time Ton from when the sensor output exceeds the threshold K due to a kicking motion until when the sensor output falls below the threshold K is "motion duration time". It is assumed that time Toff until the kicking motion is completed at the position P1 of the leg after the motion duration time Ton has passed is "motion completion estimated time". The motion duration time measuring unit 21 of the detector 20 measures the motion duration time Ton. The motion completion estimated time calculator 23 of the detector 20 calculates the motion completion estimated time Toff.

In the disclosure, the motion completion estimated time Toff is calculated according to the motion duration time Ton (a specific example will be described later). That is, the motion completion estimated time Toff depends on the motion duration time Ton. Therefore, in a case where the kicking speed is faster as indicated by the solid line in FIG. 5B, the motion duration time Ton is shorter. Therefore, the motion completion estimated time Toff becomes shorter. In addition, in a case where the kicking speed is slower as indicated by the solid line in FIG. 5C, the motion duration time Ton is longer. Therefore, the motion completion estimated time Toff becomes longer. In both the cases, since the opening operation or the closing operation of the back door 2 starts at a time point when the motion completion estimated time Toff has elapsed, that is, at a time point when the kicking motion is completed. Therefore, the problem that the user feels that the time taken for the door to open or close is long or short can be solved.

Figure 6A:
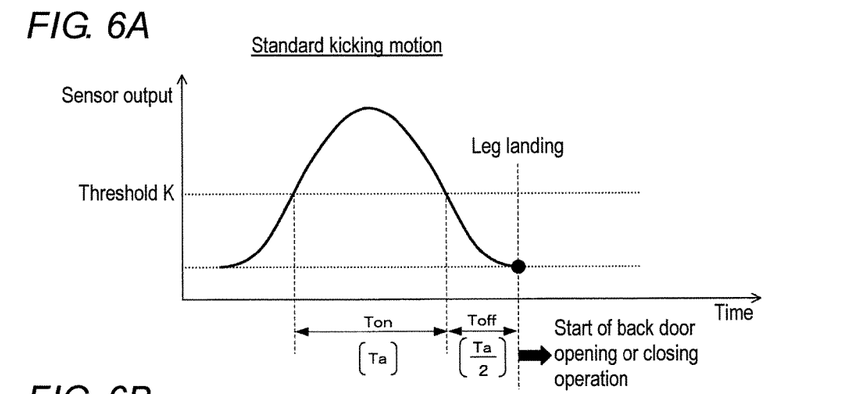
FIGS. 6A to 6C are diagrams for explaining a specific example of one or more embodiments of the disclosure.
Figure 6B:
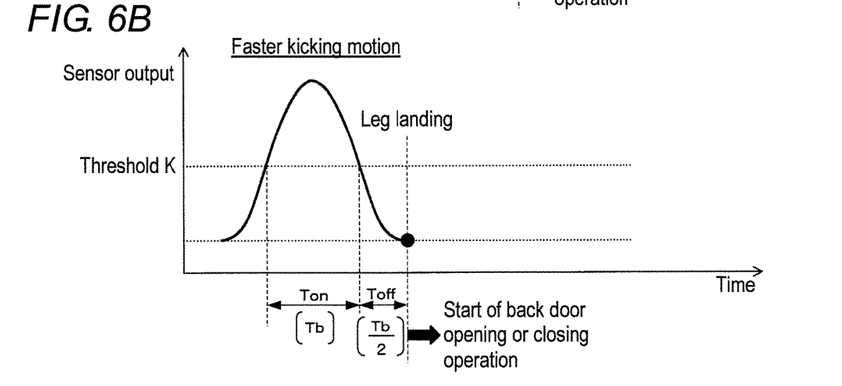
Figure 6C:
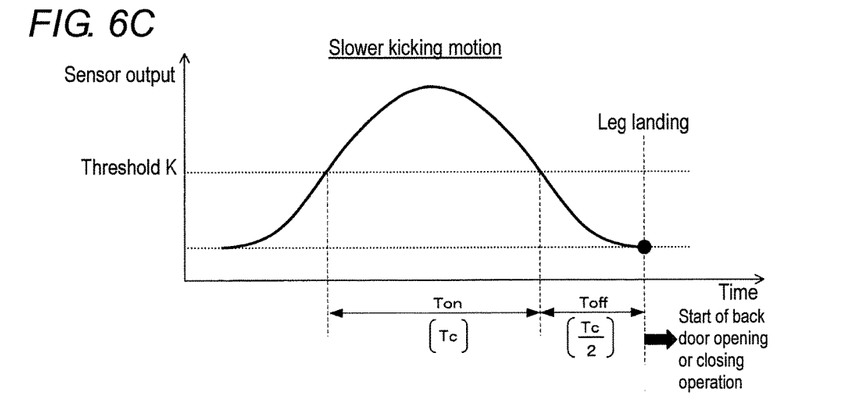

FIGS. 6A to 6C illustrate waveforms of the actual sensor output and a specific example of the method of calculating the motion completion estimated time Toff. FIG. 6A illustrates the output waveform in a case where the kicking speed is the standard speed, which corresponds to the broken lines in FIGS. 5B and 5C. FIG. 6B is the output waveform in a case where the kicking speed is faster, which corresponds to the solid line in FIG. 5B. FIG. 6C is the output waveform in a case where the kicking speed is slower, which corresponds to the solid line in FIG. 5C.

In FIGS. 6A to 6C, time of ½ of the motion duration time Ton is calculated as the motion completion estimated time Toff. For example, in the case of FIG. 6A, assuming that the motion duration time (Ton) is Ta, the motion completion estimated time (Toff) is Ta/2. In the case of FIG. 6B, assuming that the motion duration time (Ton) is Tb (Tb<Ta), the motion completion estimated time (Toff) is Tb/2. In the case of FIG. 6C, assuming that the motion duration time (Ton) is Tc (Ta<Tc), the motion completion estimated time (Toff) is Tc/2. That is, the motion completion estimated time Toff is proportional to the motion duration time Ton. When the motion duration time Ton is shorter, the motion completion estimated time Toff is also shorter. When the motion duration time Ton is longer, the motion completion estimated time Toff is also longer.

As described above, the motion completion estimated time is calculated by formula Toff=Ton/2 because of the experimental fact that time (Ton/2) until sensor output falls below the threshold K from a peak value is nearly equal to the time until the leg has landed after sensor output has fallen below the threshold K. Therefore, it can be regarded that the leg has landed and the kicking motion is completed when the motion completion estimated time Toff has elapsed after the motion duration time Ton has elapsed. The back door 2 starts to open or close at a time point when the motion completion estimated time Toff has elapsed. Therefore, it is possible to open or close the back door 2 according to the time point when the kicking motion is completed (time point when the leg has landed). Therefore, even in a case where a kicking motion of any of the patterns in FIGS. 6A to 6C is performed, it is possible to open or close the door at the optimal timing according to the kicking speed of each pattern. Therefore, the user does not feel uncomfortable.

Figure 7A:
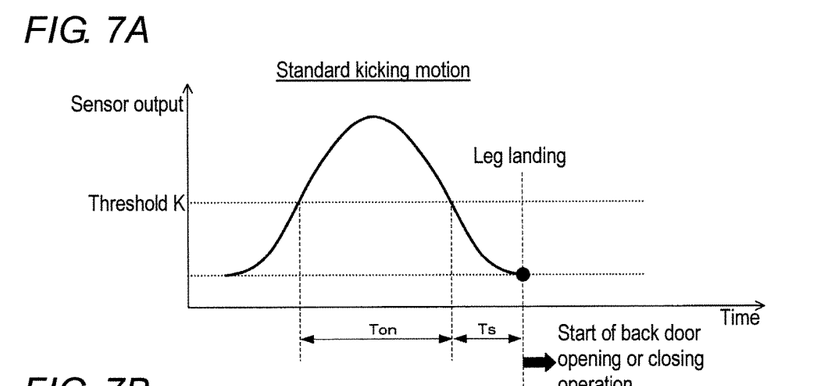
FIGS. 7A to 7C are diagrams for explaining conventional door opening and closing control.
Figure 7B:
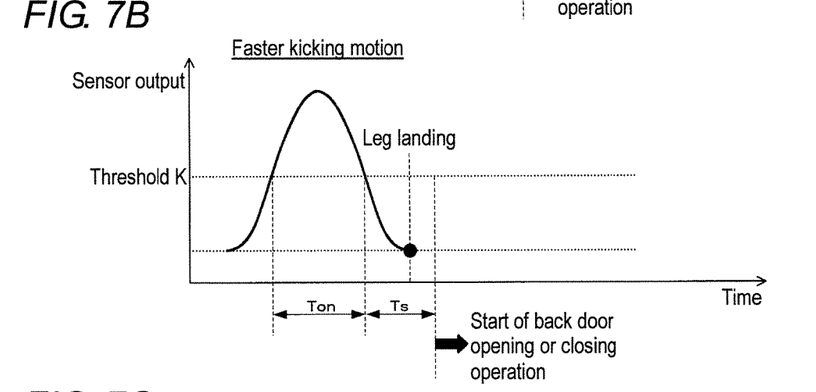
Figure 7C:
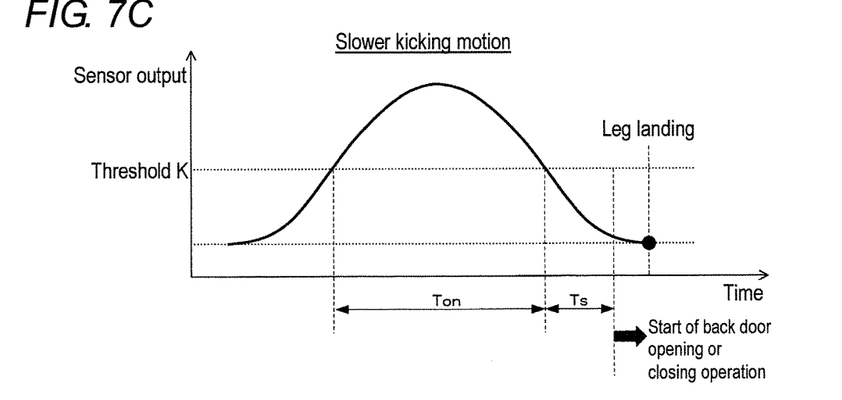

In a conventional case illustrated in FIGS. 7A to 7C, in any of the patterns in FIGS. 7A to 7C, the back door starts to open or close at a time point when a fixed time Ts set to a fixed value has elapsed after the motion duration time Ton has elapsed. Therefore, in the case illustrated in FIG. 7B, door opening or closing is not started even when landing is completed. In the case illustrated in FIG. 7C, door opening or closing is started before landing is completed. However, such a problem does not occur according to the disclosure.

Figure 8:
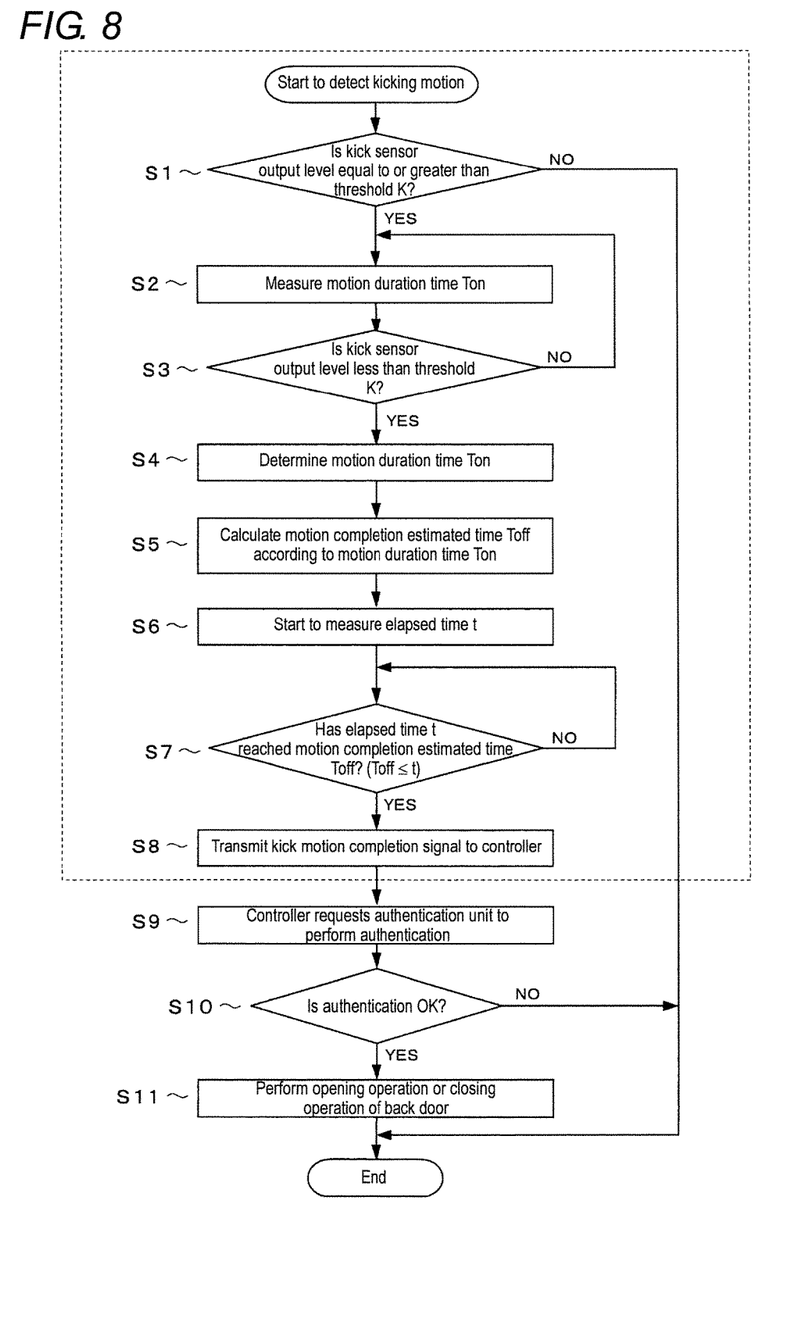
FIG. 8 is a flowchart illustrating operation of the vehicle door opening and closing control device.

FIG. 8 is a flowchart illustrating operation of the vehicle door opening and closing control device 100. Steps enclosed by a broken line are a procedure executed by the detector 20.

In step S1, the detector 20 determines whether or not output level of the kick sensor is equal to or greater than the threshold K. If the output level of any one of the kick sensors 11 to 14 is equal to or greater than the threshold K (step S1: YES), the process proceeds to step S2. If the output level is not equal to or greater than the threshold K (step S1: NO), the process is terminated.

In step S2, the motion duration time measuring unit 21 measures the motion duration time Ton. Subsequently, in step S3, the detector 20 determines whether or not the output level of the kick sensor is less than the threshold K. If the output level is less than the threshold K (step S3: YES), the process proceeds to step S4. If the output level is not less than the threshold K (step S3: NO), the process returns to step S2, and measurement of the motion duration time Ton continues.

In step S4, the motion duration time Ton is determined. In the following step S5, according to the motion duration time Ton, the motion completion estimated time calculator 23 calculates the motion completion estimated time Toff. In the above example, Toff=Ton/2.

Next, in step S6, the elapsed time measuring unit 22 starts to measure elapsed time t after the output level of the kick sensor falls below the threshold K (after the motion duration time Ton has elapsed). Then, in the following step S7, the detector 20 determines whether or not the elapsed time t has reached the motion completion estimated time Toff (Toff≤t). If Toff≤t is satisfied (step S7: YES) as a result of determination, the detector 20 determines that the kicking motion is completed and the process proceeds to step S8. If Toff≤t is not satisfied (step S7: NO), the detector 20 determines that the kicking motion is not completed, and step S7 is repeated.

In step S8, a kicking motion completion signal is transmitted from the detector 20 to the controller 30. The following steps S9 to S11 are a procedure executed by the controller 30.

When the controller 30 receives the kicking motion completion signal from the detector 20, the controller 30 requests the authentication unit 40 to authenticate the portable device 200 in step S9. Then, in step S10, the controller 30 determines whether or not the authentication result notified from the authentication unit 40 is OK. If the authentication result is OK (step S10: YES), the process proceeds to step S11. If the authentication result is not OK (step S10: NO), the process is terminated.

In step S11, the controller 30 transmits an opening and closing control signal for opening or closing the back door 2 to the door opening and closing unit 300 to execute opening operation or closing operation of the back door 2.

As described above, when the authentication unit 40 authenticates the portable device 200 as an authorized portable device and the elapsed time t has reached the motion completion estimated time Toff, the opening operation or the closing operation of the back door 2 of the vehicle V starts.

Figure 9:
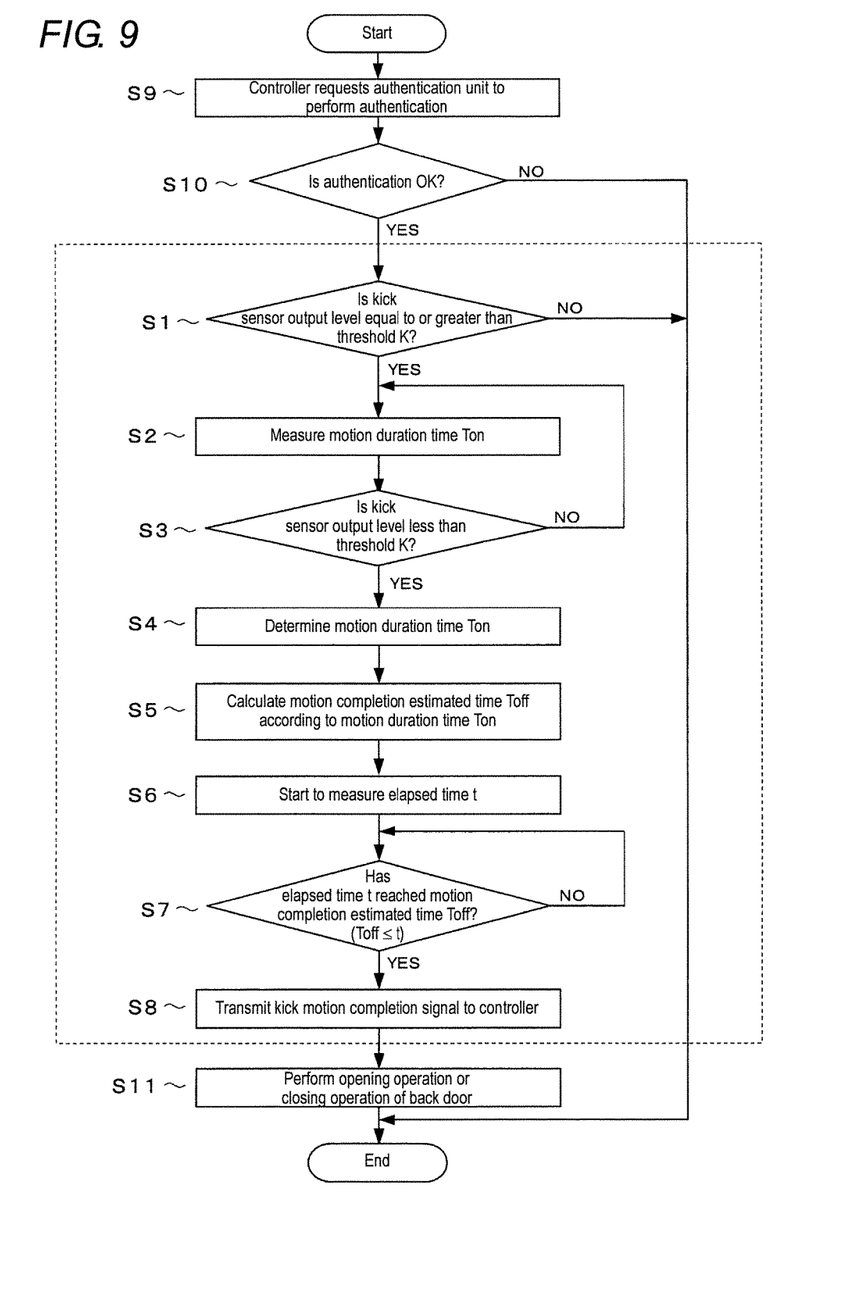
FIG. 9 is a flowchart according to another embodiment.

FIG. 9 illustrates a flowchart according to another embodiment. In FIG. 9, steps performing identical processes as those in FIG. 8 are denoted by identical reference signs in FIG. 8. In the case of FIG. 8, authentication is performed after the kicking motion is completed. However, in the case of FIG. 9, authentication is performed before a kicking motion is detected. Therefore, steps S9 and S10 in FIG. 8 are executed before step S1. According to the embodiment illustrated in FIG. 9, time until the back door 2 has opened or closed after completion of the kicking motion can be shortened.

In the disclosure, in addition to the embodiments described above, various embodiments described below can be adopted.

In FIG. 3, the detector 20 includes the motion duration time measuring unit 21, the elapsed time measuring unit 22, and the motion completion estimated time calculator 23. However, the functions of the motion duration time measuring unit 21, the elapsed time measuring unit 22, and the motion completion estimated time calculator 23 may be incorporated in the controller 30.

In the above embodiments, an example is described in which time of ½ of the motion duration time Ton is calculated as the motion completion estimated time Toff. However, the disclosure is not limited to this. The value of N (0<N<1) in the formula Toff=N·Ton may be appropriately selected.

In the above embodiments, an example of using the capacitive proximity sensor as each of the kick sensors 11 to 14 is described. However, another sensor such as a reflective optical sensor or an ultrasonic sensor may be used in lieu of the capacitive proximity sensor. In addition, each of the kick sensors 11 to 14 may be configured of a single sensor element or a plurality of sensor elements.

In the above embodiments, an example of detecting a kicking motion of swinging a leg forward is described. However, the disclosure is not limited to this example. For example, in lieu of swinging a leg forward, a motion of only moving a leg in the front-back direction, the right-left direction, or an oblique direction may be detected. In addition, the body part to be detected is not limited to a leg, but may be an arm or the like.

In the above embodiments, the case of opening or closing the back door 2 is described as an example. However, the door to be opened or closed may be a sliding door. In this case, the kick sensors 11 to 14 are provided near the sliding door on a side of a vehicle. In addition, the door to be opened or closed may be a door for opening and closing a trunk.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle door opening and closing control device comprising:
    a sensor provided near a door of a vehicle, and configured to detect a predetermined motion of a body part of a user according to approach and separation of the body part of the user; and
    a controller configured to perform one of opening operation and closing operation of the door of the vehicle, according to the predetermined motion detected by the sensor,
    wherein a threshold is set for output from the sensor, the vehicle door opening and closing control device further comprising:
    a first time measuring unit configured to measure motion duration time until the output from the sensor falls below the threshold after the output from the sensor exceeds the threshold in the predetermined motion;

a second time measuring unit configured to measure elapsed time after output from the sensor falls below the threshold; and a calculator configured to calculate motion completion estimated time until the predetermined motion is completed after the motion duration time measured by the first time measuring unit elapses, the motion completion estimated time calculated according to the motion duration time, wherein when the elapsed time measured by the second time measuring unit reaches the motion completion estimated time calculated by the calculator, the controller starts one of opening operation and closing operation of the door of the vehicle.

2. The vehicle door opening and closing control device according to claim 1, wherein the calculator calculates time of ½ of the motion duration time measured by the first time measuring unit as the motion completion estimated time.

3. The vehicle door opening and closing control device according to claim 1, wherein the sensor detects a predetermined motion of a leg of a user according to approach and separation of the leg.

4. The vehicle door opening and closing control device according to claim 3, wherein the predetermined motion is a kicking motion of the leg.

5. The vehicle door opening and closing control device according to claim 1, further comprising an authentication unit configured to authenticate whether a portable device carried by a user is an authorized portable device according to identification information transmitted from the portable device carried by the user, wherein, in a case where the authentication unit authenticates the portable device as the authorized portable device and the elapsed time reaches the motion completion estimated time, the controller starts one of the opening operation and the closing operation of the door of the vehicle.

6. The vehicle door opening and closing control device according to claim 5, wherein the authentication unit authenticates whether the portable device is the authorized portable device after the predetermined motion is detected by the sensor.

7. The vehicle door opening and closing control device according to claim 5, wherein the authentication unit authenticates whether the portable device is the authorized portable device before the predetermined motion is detected by the sensor.

* * * * *